INVENTOR.
GEORGE EVERETT

INVENTOR.
GEORGE EVERETT

INVENTOR.
GEORGE EVERETT
BY
*Harry G. Mapio*
ATTORNEY

United States Patent Office 3,432,033
Patented Mar. 11, 1969

3,432,033
AUTOMATIC INSPECTION DEVICE
George Everett, Burlington, Unionville, Conn., assignor, by mesne assignments, to The Stanley Works, New Britain, Conn., a corporation of Connecticut
Filed Mar. 30, 1967, Ser. No. 627,050
U.S. Cl. 209—73
Int. Cl. B65d 41/12; B07c 9/00
16 Claims

ABSTRACT OF THE DISCLOSURE

Automatic inspection device for bottle crowns or the like, employing reciprocatory gauging plungers to determine presence and thickness of crown liners. The position of a lifter on each plunger is controlled by a trigger which is tripped by a gauging cam or which passes the cam, depending upon the height of the plunger above an inspection table. The plunger lifter engages a lifting cam at one station or another, in accordance with the lifter position, to raise the plunger and release the associated crown for removal from the inspection table.

This invention relates to an automatic inspection device and more particularly to apparatus for inspecting bottle caps and for segregating the caps in accordance with the presence or absence of a liner of predetermined thickness.

In Patent No. 3,135,019, issued June 2, 1964, and Patent No. 3,212,131, issued Oct. 9, 1965, both to Ernest O. Aichele, machines are described for forming and applying resilient sealing liners of thermoplastic material to closure caps, especially to crown caps used for sealing bottles, jars, and the like. Such machines operate continuously to produce lined caps in quantity at high speed. Accurately metered charges of moldable plastic material are delivered to the caps sequentially, and the liners are molded in situ by the molding plungers of a forming turret.

For proper sealing action it is essential that each crown contain a liner of predetermined thickness, that is, within predetermined thickness tolerances. If an improperly lined cap is applied to a bottle, for example, improper sealing will result because the skirt of the cap will ride too high or too low upon the lip of the bottle.

Consistent delivery of very small, precisely metered charges of moldable material at high speed is difficult. Occasionally too much material (such as a double charge) may be delivered to a cap, resulting in a liner which is too thick, or too little material may be delivered, resulting in a liner which is too thin, or no material may be delivered, resulting in no liner at all. Notwithstanding the fact that defective liners may be present in only a small percentage of the total production, the incidence is sufficient to make inspection imperative.

Visual inspection is not practical at high speed. Among the prior mechanisms for inspecting bottle caps are the vacuum type, which detects the presence of air leaks, and the mechanical type, which merely senses the presence or absence of a liner. None of the prior apparatus is capable of ensuring a proper seal, because, as pointed out above, the mere presence of a liner does not ensure a proper seal. The liner must have a predetermined thickness.

It is therefore a principal object of the present invention to provide an improved automatic inspection device for bottle caps or the like.

Another object of the invention is to provide improved apparatus for detecting the presence or absence of a cap liner within predetermined thickness tolerances and for segregating improperly lined caps.

More generally, it is an object of the invention to provide improved apparatus responsive to the thickness of articles to be tested.

Yet another object of the invention is to provide apparatus of the foregoing type which is simple, completely mechanical, accurate, versatile, and which is capable of high speed continuous operation.

Briefly stated, a preferred embodiment of the apparatus of the invention employs a conveyor having an inspection table to which bottle caps are fed serially at a first station. The inspection conveyor is provided with a series of reciprocating gauging plungers, and as each cap is fed onto the inspection table a plunger descends to engage the liner of the cap. Each plunger has a lifter which may assume either of two positions, depending upon the depth to which the plunger descends into the cap. The position of the lifter determines whether the lifter engages a lifting cam at a second or a third station. The plungers are raised to release the associated caps at the second or third station, and the caps are there removed from the inspection table and hence segregated. Positioning of each lifter is controlled by a trigger which projects from the plunger. The height of the trigger above the inspection table determines whether the trigger passes or engages a gauging cam located between the first and second stations and hence determines whether or not the trigger is tripped, permitting the lifter to move to one of its positions, or to remain in its other position. Lifters are reset, when necessary, before approaching the first station.

The foregoing and other objects, advantages, and features of the invention will become more readily apparent upon consideration of the following detailed description taken in conjunction with the accompanying drawings, which illustrate a preferred and exemplary embodiment and wherein.

Figure 1:
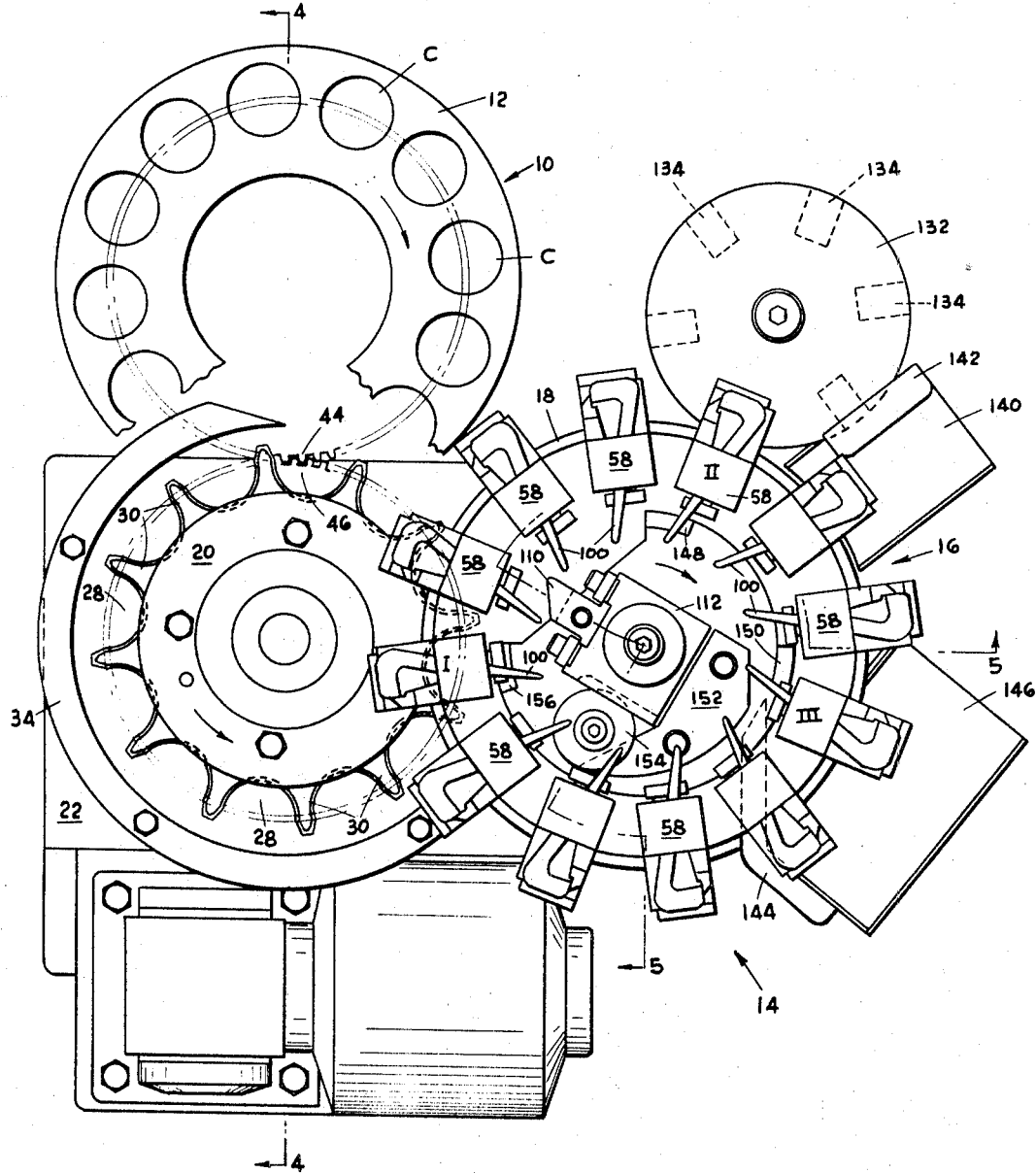
FIGURE 1 is a plan view, partly broken away, illustrating an inspection device of the invention associated with the forming turret of a cap lining machine.

Referring to the drawings, FIGURE 1 illustrates the application of the inspection device of the invention to an existing crown liner forming machine 10 having a forming turret 12 with an anvil which supports bottle caps C during the formation of plastic liners by vertically reciprocating molding plungers (not shown). In the machines described in the foregoing prior patents, the lined caps are delivered to a discharge chute. In accordance with the present invention, however, it is desired to inspect each cap prior to discharge, and an inspection device 14 is associated with the liner forming machine.

Figure 4:
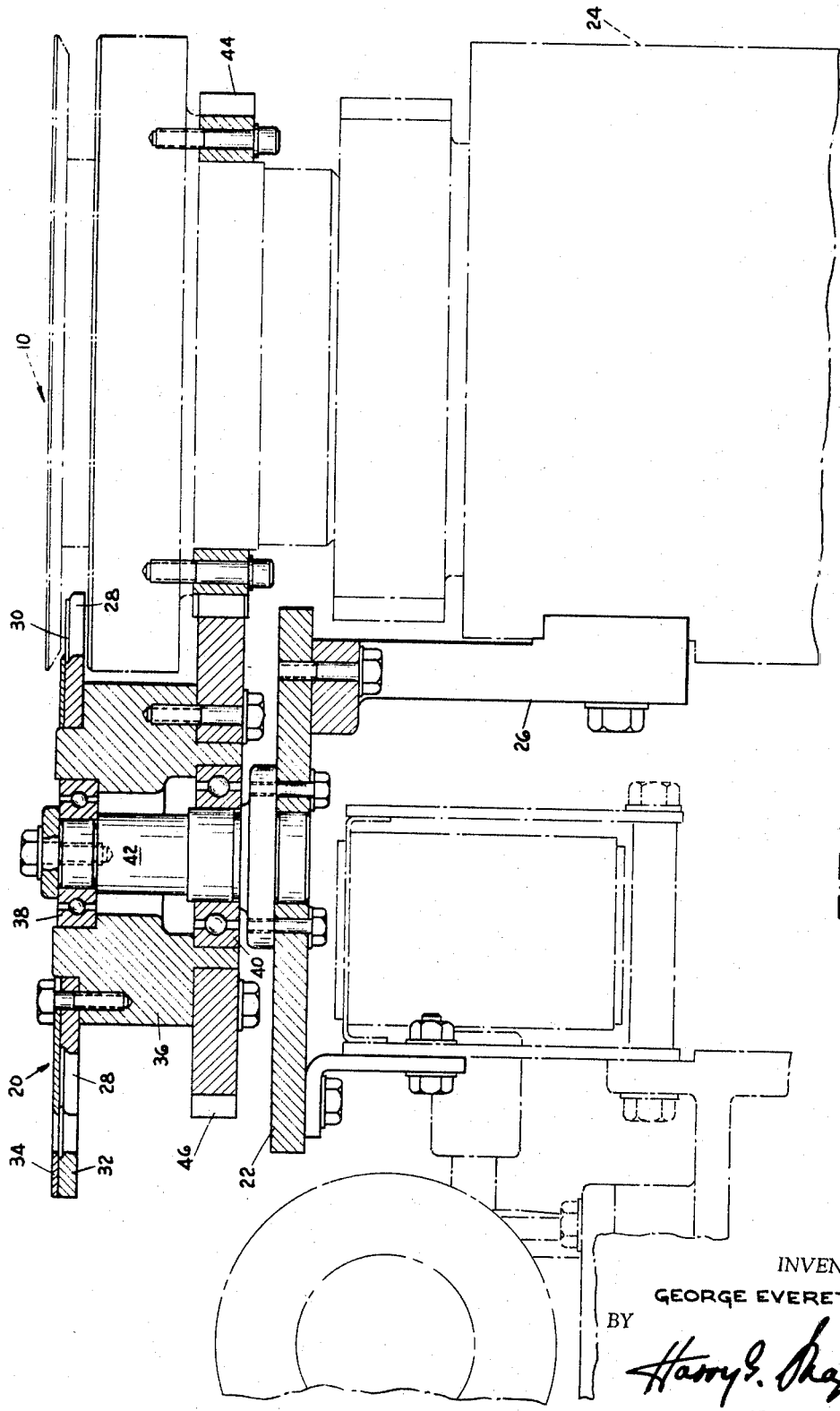
FIGURE 4 is a sectional view taken along line 4—4 of FIGURE 1.

An inspection device of the invention comprises a rotary conveyor 16 having an inspection table 18 to which the caps C are delivered by a conventional transfer wheel 20. The inspection conveyor 16, transfer wheel 20, and other apparatus of the invention to be described may be mounted upon a base or frame 22, which (see FIGURE 4) may be supported upon the base 24 of the forming machine 10 by means of a bracket 26.

Transfer wheel 20 has a series of cap-receiving notches 28 provided with countersunk internal ledges or lips 30 upon which seat the flaring runs or skirts of the cap bodies. The transfer wheel is associated with a cap supporting ring 32 (FIGURE 4) having an overlying cap retaining ring 34 to hold the caps on the transfer wheel. The hub 36 of the wheel is rotatably mounted by bearings 38 and 40 upon a stub shaft 42 projecting upwardly from the base 22. The hub may be driven by gears 44 and 46, the former being bolted to the forming turret and the latter to the hub of the transfer wheel.

Figure 2:
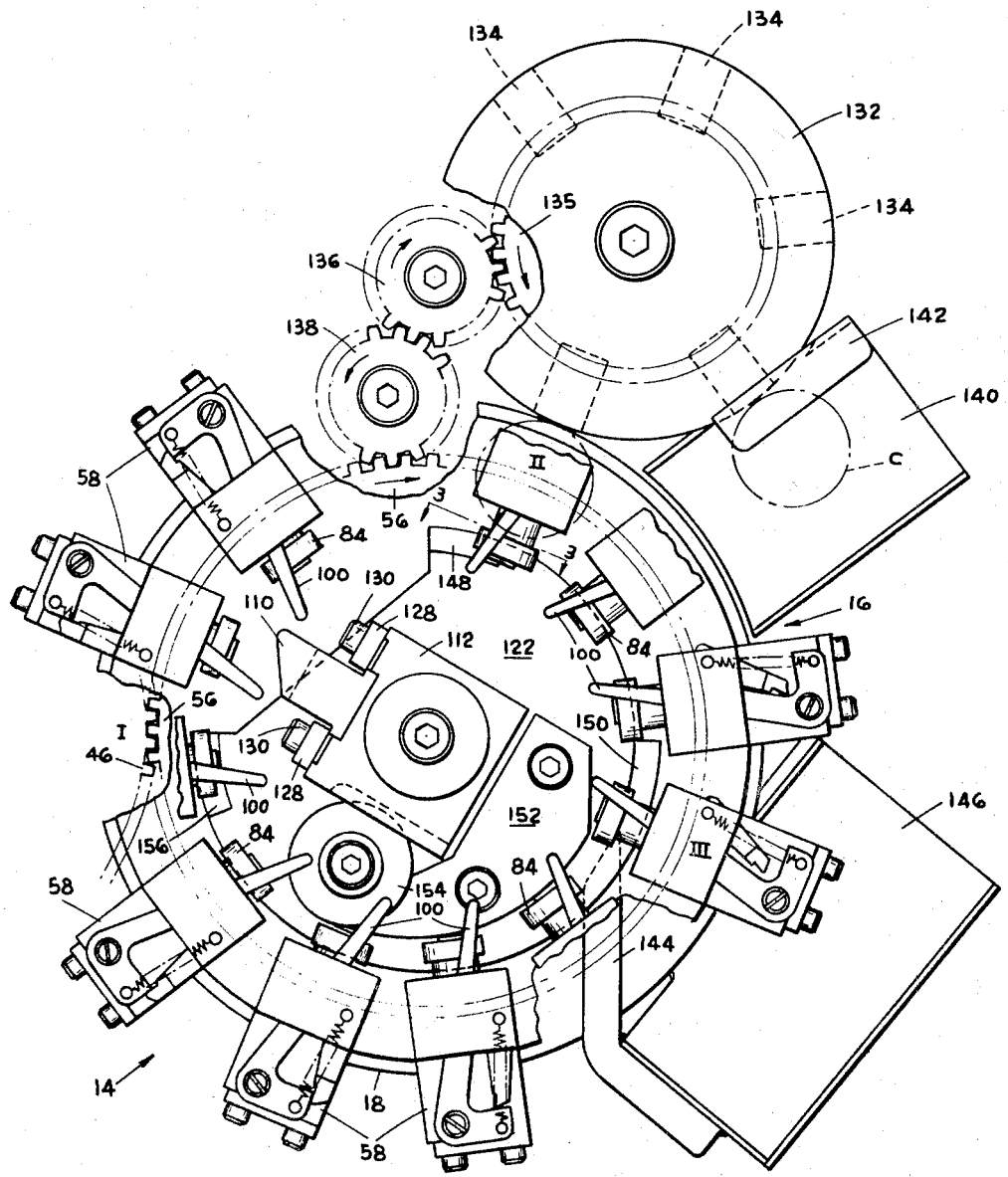
FIGURE 2 is an enlarged plan view, partly broken away, illustrating the inspecting and segregating apparatus of the invention.
Figure 5:
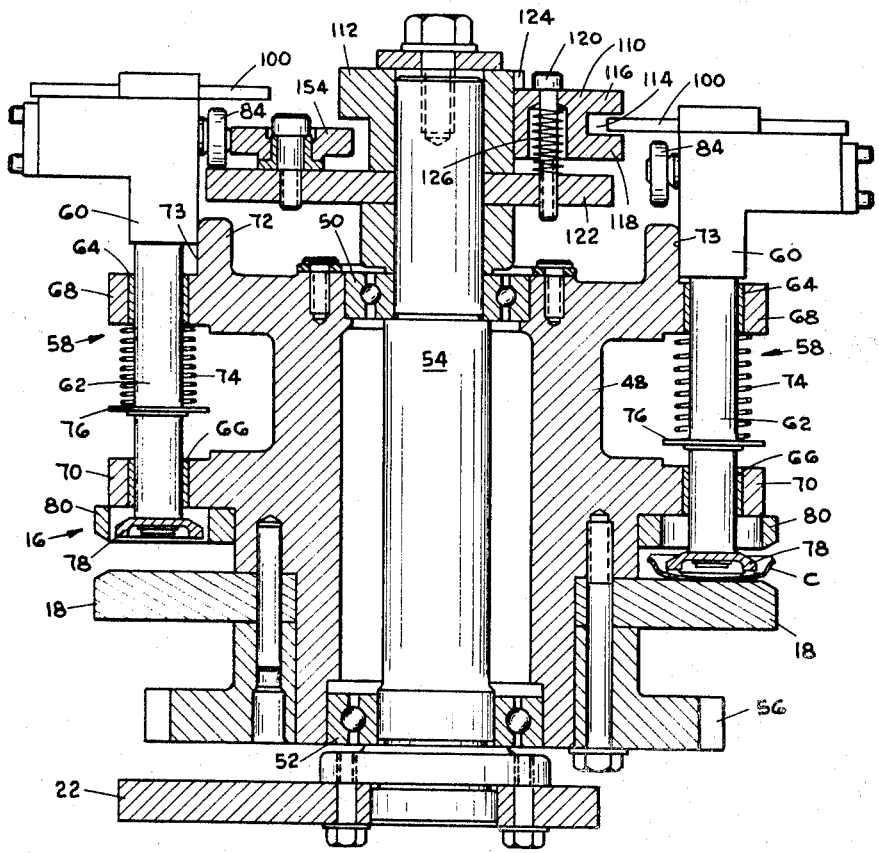
FIGURE 5 is a sectional view taken along line 5—5 of FIGURE 1.

As shown in FIGURE 5, the hub 48 of the inspection conveyor 16, rotatably mounted by bearings 50 and 52 upon a stub shaft 54 projecting upwardly from the base 22, may be driven by a gear 56 which meshes with gear 46 of the transfer wheel (see FIGURE 2).

The inspection conveyor supports a plurality of vertically reciprocating gauging plungers 58 (there being twelve plungers in the illustrative form) spaced about the periphery of the conveyor. Each plunger has a body 60 (FIGURE 5) and a depending shaft 62, which may be pinned to the body. The shaft is mounted for reciprocation in bushings 64 and 66 held in corresponding bores of bosses 68 and 70 of the hub 48. An upraised flange 72 of the hub has an outwardly facing flat surface 73 which engages an inwardly facing flat surface of the body 60 of each plunger to prevent turning of the plungers about the axes of shafts 62. Each plunger is biased downwardly by a light compression spring 74 surrounding the shaft 62 between boss 68 and a washer 76 positioned on the shaft by a retainer ring. At the bottom of each plunger shaft 62 is mounted a gauging pad 78, shaped to enter a bottle cap and engage the liner therein. When the plungers are raised, the pads 78 withdraw into corresponding apertures of a stripper plate 80, so that release of the caps is ensured.

Figure 10:
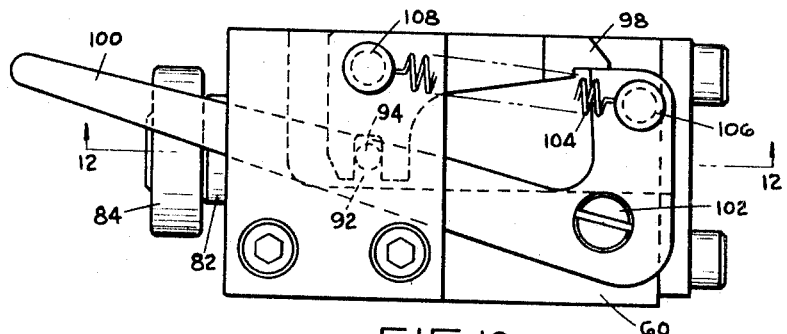
FIGURE 10 is an enlarged plan view illustrating a mechanism, including a trigger, for positioning a gauging plunger lifter.
Figure 11:
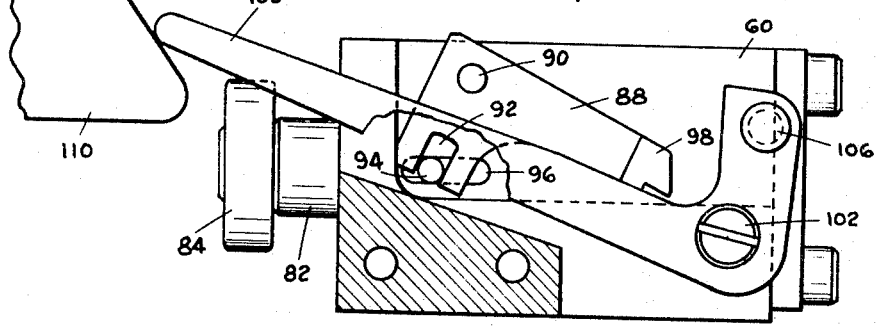
FIGURE 11 is a similar view, shown in section, illustrating the manner in which the lifter is moved if the gauging plunger senses a defective cap.
Figure 12:
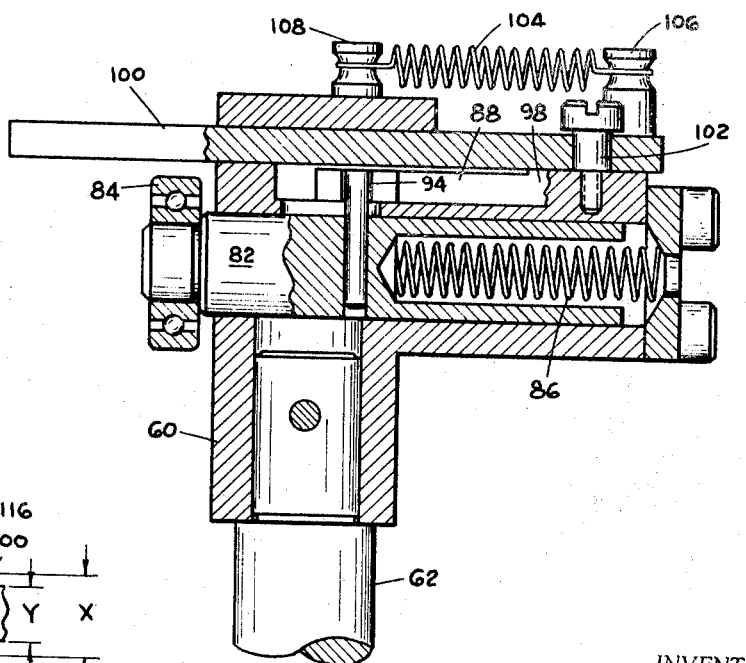
FIGURE 12 is a sectional view along line 12—12 of FIGURE 10.

As shown in FIGURES 10–12, the body 60 of each gauging plunger has a transverse bore containing a shaft 82, the exposed end of which supports a ball bearing roller 84. The other end of shaft 82 is hollow and surrounds a compression spring 86 which urges the roller shaft 82 to project from the body 60 and to move the roller 84 laterally of plunger shaft 62 to the position of FIGURE 11. Roller shaft 82 is normally held in the position of FIGURES 10 and 12 (against the bias of spring 86) by a latch 88 pivotally mounted at 90 upon the body 60. The latch has a notch 92 which embraces a pin 94 projecting upwardly from the roller shaft 82 and movable in a slot 96 of the body 60. The cam nose 98 of the latch 88 projects upwardly and latches over the foot of a trigger 100 as shown in FIGURE 10. The trigger is generally L-shaped and is pivotally supported by a pin 102 upon the body 60. A tension spring 104, having one end fixed to a pin 106 upon the trigger and the other end fixed to a pin 108 upon the body 60, biases the trigger to the position of FIGURE 10.

If the trigger is tripped to the position of FIGURE 11, as by a gauging cam 110 to be described hereinafter, the latch is released, and the roller shaft bias spring 86 moves the shaft 82 and the roller 84 to the position of FIGURE 11, turning the latch 88 to the position shown. When the trigger 100 is disengaged from cam 110, it will return to the position of FIGURE 10, but the roller 84 and the latch 88 will remain in the position of FIGURE 11. If the roller 84 is pushed back to the position of FIGURE 10, the nose 98 of the latch 88 will cam against the opposing surface of the trigger so as to tilt the trigger and permit the latch to return to the position of FIGURE 10.

Figure 9:
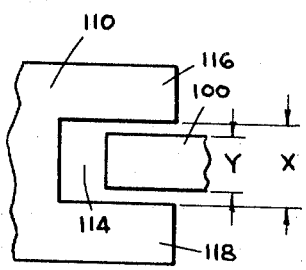
FIGURE 9 is a fragmentary elevation view illustrating the cooperation of a gauging plunger trigger with the gauging cam.

The gauging cam 110 is supported upon a block 112 fixed at the top of the inspection conveyor shaft 54 (see FIGURES 2 and 5) and has a notch 114 defined between overlying and underlying cam abutments 116 and 118, respectively. As shown in FIGURE 9, the vertical dimension (width) X of the notch 114 is related to the vertical dimension (thickness) Y of the trigger 100, so that the trigger may pass through the notch (with tolerance X–Y) if the height of the trigger above the inspection table 18 (FIGURE 5) is properly related to the height of the notch 114 above the inspection table. The height of the notch above the inspection table may be adjusted by turning a screw 120 which passes freely through the gauging cam and is threaded into a plate 122 fixed near the top of the shaft 54. Block 112 has a vertical channel 124 into which the gauging cam fits for vertical movement, the gauging cam being held against the head of the screw 120 by a compression spring 126. Clamps 128 (FIGURE 2) are normally tightened, as by screws 130 threaded into the block 112, to maintain the position of the gauging cam. The gauging cam abutments 116 and 118 are angulated in horizontal planes, and the salient ends of the triggers are rounded off to form cam followers cooperating with the angulated cam surfaces. For versatility gauging cam 110 may be replaced by other gauging cams having slots of different height.

In accordance with the invention, the bottle caps fed on to the inspection conveyor 16 at a first station I (FIGURE 1) are removed from the inspection conveyor at a second station II if the caps are improperly lined or at a third station III if the caps are properly lined. The gauging cam 110 is located between stations I and II, and in the form shown the triggers 100 project radially inward with respect to the axis of the inspection conveyor 16.

As will be seen hereinafter, if the cap is improperly lined, the associated gauging plunger will be raised to release the cap at station II, where the cap may be removed from the inspection conveyor by a magnetic pick-off. The pick-off may comprise a stainless steel disc 132 having a series of circumferentially spaced permanent magnets 134 arranged to pass by station II in sequence. In the form shown there are six magnets 134, and the disc 132 is driven at twice the angular velocity of the inspection conveyor by means of a gear 135 (FIGURE 2) fixed to the disc and driven from gear 56 of the inspection conveyor through idler gears 136 and 138. A defective cap C is attracted to one of the magnets 134 and is transferred from the inspection conveyor 16 to a discharge chute 140 having a cap stripper 142. Properly lined caps, on the other hand, are extracted from the inspection conveyor by a finger 144 positioned in the path of the caps and directing them into a discharge chute 146.

It now remains to describe the manner in which the gauging plungers 58 are operated to engage the caps at station I and to release the caps at station II or station III.

Figure 7:
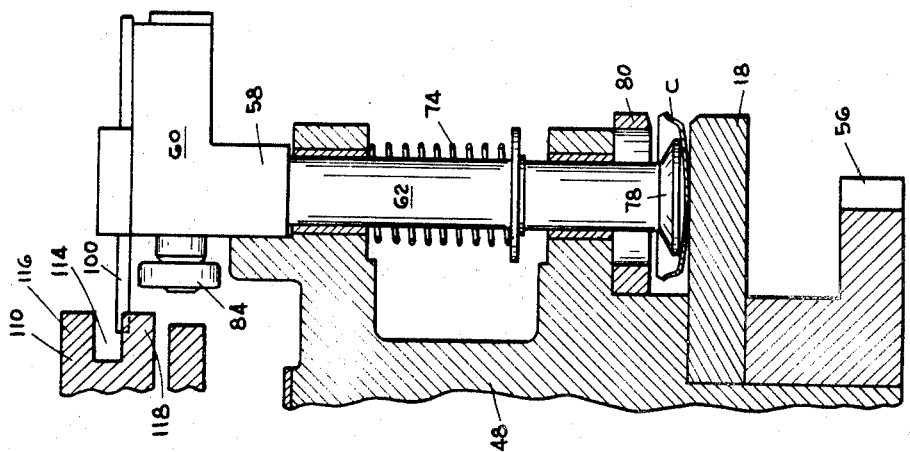
Figure 6:
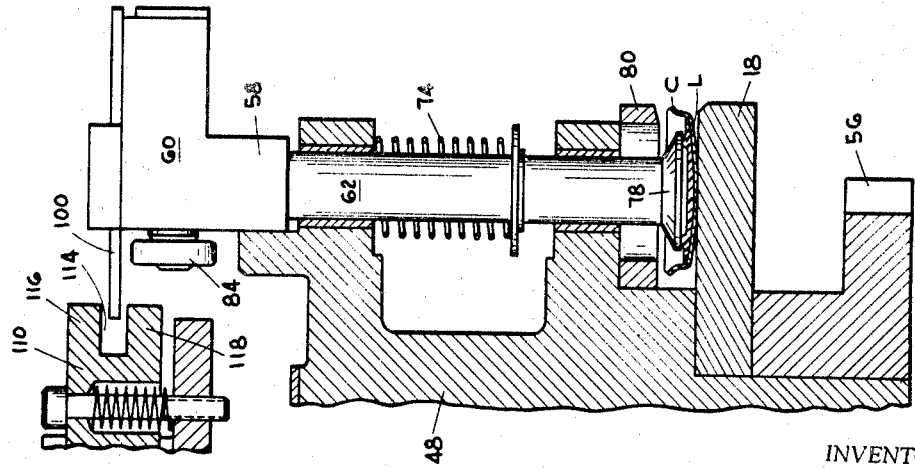

Referring to FIGURE 6, it will be seen that when a gauging plunger 58 is lowered to engage a liner L of proper thickness within a cap C, the trigger 100 will be positioned so as to pass through the notch 114 in the gauging cam 110. If, however, the gauging plunger is lowered into a cap without a liner, as shown in FIGURE 7, or onto a liner that is too thin, the height of the trigger 100 above the inspection table 18 will be insufficient to permit the trigger to enter the notch 114. Instead, the trigger 100 will engage the cam abutment 118, tripping the trigger and releasing the latch, so that the roller 84 will move laterally from the position illustrated in FIGURE 6 to the position illustrated in FIGURE 7, as described above.

Figure 8:
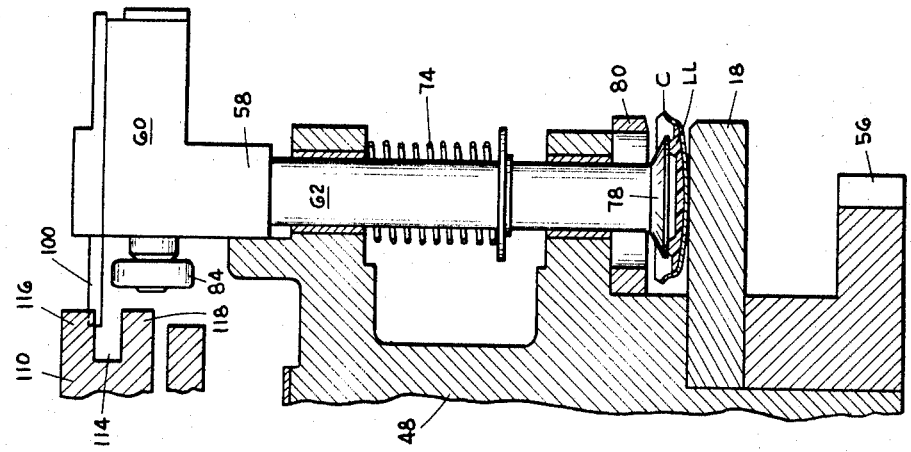
FIGURES 6, 7 and 8 are, respectively, vertical sectional views illustrating the positions of the gauging plungers for a cap having a liner of proper thickness, a cap having no liner at all, and a cap having a liner of excess thickness.

Similarly, if the plunger 58 is lowered into a cap C having a liner LL (FIGURE 8) of too great a thickness, height of the trigger 100 above the inspection table 18 will be too great to permit the trigger to pass through the notch 114. Instead, the trigger will engage the cam abutment 116, and again the trigger will be tripped so as to reposition the roller 84 as described above.

Thus, only if a liner within predetermined thickness tolerances is present in the cap, will the trigger 100 pass through the notch 14 and permit the roller 84 to remain undisturbed. In all other cases (no liner, liner too thick, liner too thin) the trigger will be tripped and the roller 84 will move to its alternate position.

Figure 3:
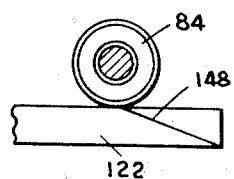
FIGURE 3 is a sectional view taken along line 3—3 of FIGURE 2.

Rollers 84 and the roller shafts 82 constitute lifters for the gauging plungers 58. Plate 122 (FIGURES 2 and 5) is provided with a first lifting cam incline 148 (FIGURES 2 and 3) radially located with respect to the axis of the inspection conveyor 16 so as to engage those rollers 84 which have been projected from the plungers due to tripping of their triggers and to lift their plungers to release the associated caps at station II.

Plate 122 is provided with a second lifting cam incline 150, located radially beyond the incline 148 so as to engage those rollers 84 which have not been projected from their plungers and to lift the plungers and release the associated caps at station III. A reset cam plate 152 is mounted upon plate 122 and has a peripheral surface which engages the projecting rollers 84 and returns them to their initial position, where they are held by the associated latches 88. Final pressure upon such rollers is exerted by a roller 154 rotatably supported upon plate 122 at the end of cam 152.

Plate 122 also has a cam decline 156 for lowering the gauging plungers upon the caps fed to the inspection table from the transfer wheel 20 at station I, slight downward pressure being exerted by the plunger springs 74 (FIGURE 5).

With the same number of forming plungers on turret 12 as there are notches 28 on transfer wheel 20 and gauging plungers 58 on inspection conveyor 16, the transfer wheel and the inspection conveyor may be driven at the same speed as the forming turret, and caps may be fed continuously from the forming turret to the inspection conveyor and discharged continuously to chutes 140 and 146 in accordance with the inspection results. High rates of speed are readily attained without an external power source. Defectively lined caps are readily detected and rejected. Unlike prior inspecting devices using gauging plungers merely to detect the presence of liners, the invention determines the thickness of the liners. Thickness tolerance of approved caps may be within ±.0035 inch, for example, and thus proper sealing of the approved caps on their bottles is ensured. Discrimination between proper and improper liners is positive. The plunger lifters always assume one position or another, and there is no possibility of jamming, as there is with prior plungers which have no provision for converting plunger height to another discrimination parameter, such as lateral position of a lifter.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalents of the claims are to be included therein.

The invention claimed is:

1. Apparatus for inspecting articles and segregating them in accordance with their thickness, comprising an inspection conveyor having a table for supporting said articles and plunger means movable toward and away from said table for engaging and releasing said articles, respectively, said plunger means carrying lifter means adapted to assume alternate positions relative to said plunger means, means for moving said plunger means toward said table at a first station for engaging said articles, means dependent upon the position of said plunger means relative to said table after engagement with said articles for controlling the position of said lifter means relative to said plunger means, means engaging said lifter means and moving said plunger means away from said table to release the associated articles at a second station if the lifter means is in one position, and means engaging said lifter means and moving said plunger means away from said table at a third station to release the associated articles if the lifter means is in the other position, whereby said articles may be removed from said table at said second and third stations depending upon article thickness.

2. The apparatus of claim 1, said means for controlling the position of said lifter means comprising means located between said first and second stations for gauging the position of said plunger means relative to said table and for causing said lifter means to move from one position to the other position if the thickness of said articles is not within predetermined tolerance.

3. The apparatus of claim 2, further comprising means for returning said lifter means to said one position after said plunger means has passed said third station.

4. The apparatus of claim 2, said lifter means being spring-biased toward said other position and having latch means for holding the lifter means in said one position and trigger means for releasing the latch means, said gauging means comprising a gauging cam shaped to pass said trigger means or to trip said trigger means in accordance with the position of said plunger means relative to said table.

5. Apparatus for inspecting bottle caps and the like and for rejecting caps which lack a liner having thickness within predetermined tolerance, comprising a conveyor movable past first, second and third stations and having a table for supporting said caps with the liner facing upwardly, means for feeding said caps to said table at said first station, said conveyor having a plurality of plungers movable toward and away from said table to engage and release said caps and having means for causing each plunger to move toward said table and to engage a cap at said first station, each of said plungers having a lifter movable to assume alternate positions relative to the plunger means including an element between said first and second stations for controlling the position of each lifter relative to its plunger in accordance with the height of the plunger relative to the table, means for engaging said lifters at said second station and for lifting their plungers to release the associated caps if the lifters are in one of their said positions, means for engaging said lifters at said third station and for lifting their plungers to release the associated caps if the lifters are in the other of their said positions, means between said third and first stations for ensuring that said lifters are in said one position when the plungers arrive at said first station, and means at said second and third stations for removing from said table caps which are released at said stations.

6. The apparatus of claim 5, said conveyor having a rotatable hub supporting said plungers at spaced locations about its periphery for reciprocative movement parallel to the axis of the hub, said table being perpendicular to the axis of the hub, said lifters extending substantially radially with respect to the axis of the hub and being movable substantially radially between said positions, said lifting means comprising cams engageable with said lifters.

7. The apparatus of claim 5, said means for ensuring that said lifters are in said one position when said plungers arrive at said first station comprising a cam engageable with said lifters for moving them to said one position.

8. The apparatus of claim 5, said means for controlling the position of said lifters comprising members supported upon the corresponding plungers, said element being a gauging cam arranged to pass or engage said members depending upon the height of the members relative to the table.

9. The apparatus of claim 8, each of said lifters being biased toward its other position and having a latch for maintaining it there, said members comprising triggers for releasing the latches.

10. The apparatus of claim 9, said gauging cam having a notch for passing said triggers and having abutments on opposite sides of the notch for engaging said triggers, the width of the notch relative to the corresponding thickness of the triggers defining said tolerance.

11. The apparatus of claim 10, further comprising means for adjusting the position of said gauging cam relative to said table.

12. The apparatus of claim 5, said means for removing said caps at said second station comprising magnetic means.

13. In inspection apparatus for sensing a parameter of an article to determine whether it is within or without predetermined tolerance, means for supporting an article, plunger means movable toward said supporting means to engage said article, a trigger movable with said plunger means relative to said supporting means, gauging means, means for moving said plunger means past said gauging means while it is engaged with said article, said gauging means being positioned to pass said trigger if said parameter is within said tolerance but to trip said trigger if said parameter is without said tolerance, and means for moving said plunger means away from said supporting means to release said article at one location or another location depending upon whether said trigger has been tripped comprising an element supported on said plunger means and located in one position or another depending upon whether or not said trigger is tripped.

14. In the apparatus of claim 13, said element comprising a shaft movable laterally of said plunger means.

15. The apparatus of claim 14, said means for moving said plunger means away from said supporting means comprising a pair of cams at said locations, respectively, for engaging a roller mounted on said shaft.

16. In the apparatus of claim 13, said gauging means comprising a cam having a notch for passing said trigger if said parameter is within tolerance.

References Cited

UNITED STATES PATENTS 3,100,570  8/1963  White _____ 209—82

ALLEN N. KNOWLES, *Primary Examiner.*

U.S. Cl. X.R.

209—74, 80, 88, 90